Oct. 7, 1924.

W. L. BALDWIN

AUTOMOBILE SIGNAL

Filed Aug. 2, 1922

WITNESSES

INVENTOR
W. L. Baldwin
BY
ATTORNEYS

Oct. 7, 1924.
W. L. BALDWIN
AUTOMOBILE SIGNAL
Filed Aug. 2, 1922     3 Sheets-Sheet 2
1,511,100
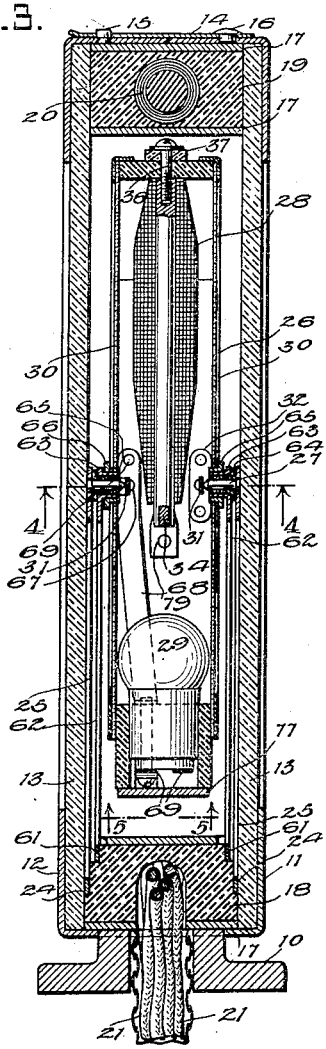
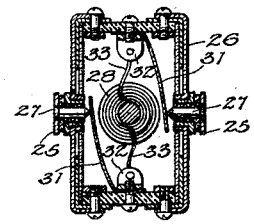
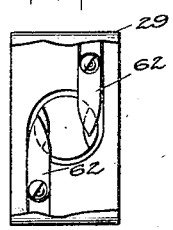
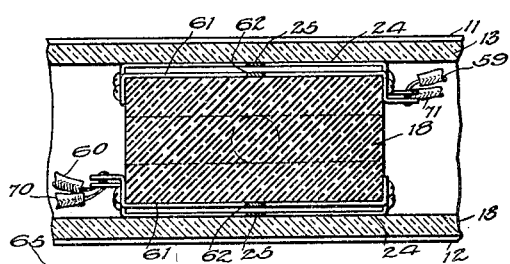

Oct. 7, 1924.

W. L. BALDWIN

AUTOMOBILE SIGNAL

Filed Aug. 2, 1922

WITNESSES
Frederick Diehl.

INVENTOR
Walter L. Baldwin
BY
ATTORNEYS

Patented Oct. 7, 1924.

1,511,100

UNITED STATES PATENT OFFICE.

WALTER LEO BALDWIN, OF NEW BEDFORD, MASSACHUSETTS.

AUTOMOBILE SIGNAL.

Application filed August 2, 1922. Serial No. 579,239.

*To all whom it may concern:*

Be it known that I, WALTER L. BALDWIN, a citizen of the United States, and a resident of New Bedford, in the county of Bristol and State of Massachusetts, have invented a new and Improved Automobile Signal, of which the following is a description.

My invention relates to automobile signals and more particularly to a signal involving a pointer to indicate direction as well as a stop signal.

The general object of my invention is to provide a signal of the indicated character operated by electromagnetic means and positive in its functioning to indicate turning to the right or left as well as to promote simplicity of assemblage.

A further object of the invention is to provide a signal of the indicated type having the maximum visibility as viewed either from in front of the automobile or in the rear thereof.

The manner in which the above and other objects are attained will appear from the specific description following:

Reference is to be had to the accompanying drawing forming a part of this specification, it being understood that the drawings are merely illustrative of one example of the invention.

Figure 3 is a transverse vertical section as indicated by the line 3—3, Figure 2;

Figure 4 is a horizontal section through the pointer, the section being taken in a plane corresponding with the line 4—4 of Figure 3;

Figure 5 is a bottom view of the pointer lamp with part broken away, the view being indicated by the line 5—5, Figure 3;

Figure 6 is a horizontal section on the line 6—6, Figure 2;

Figure 7 is a plan view of the pointer as viewed in the horizontal or indicating position;

Figure 1:
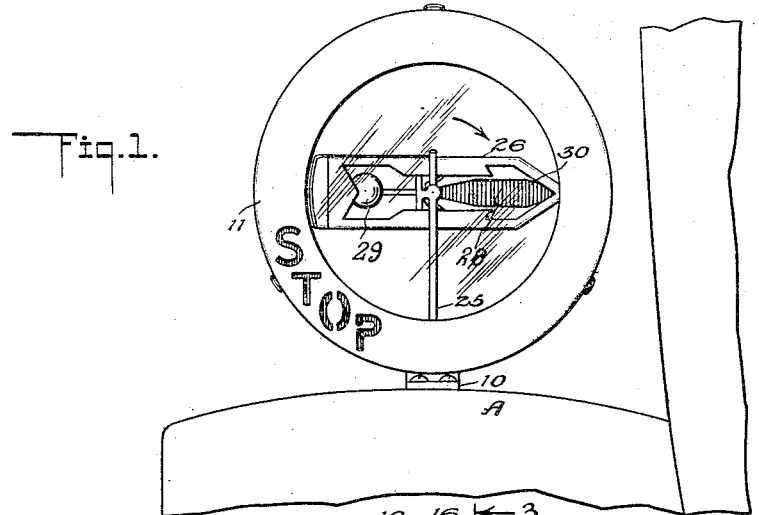
Figure 1 is an elevation of an automobile signal embodying my invention.

My improved signal is preferably and advantageously mounted in practice on the fender of an automobile to be visible from the front or rear. In the illustrated example a base 10 is provided, adapted to be suitably fastened by screws or the like to the top of a fender conventionally indicated at A. A sectional enclosing case is provided formed in practice in half sections 11, 12 and having glass or equivalent transparent front and back 13 so that the signal is visible as viewed from the front or the rear. The casing sections 11, 12 are secured in the illustrated example by spring plate fasteners 14 on one section adapted to engage studs 15 on the other casing section, said fasteners 14 being pivotally mounted as by rivets 16 so as to swing transversely to the plane of the casing for fastening the sections or to fold in the plane of one section, 11, when the sections are unfastened and removed.

On the base 10 within the casing 11, 12 is a frame composed of inner and outer flat rings 17 spaced at the bottom by an insulating block 18 rigid with the base 10 and spaced at the sides and top by insulating blocks 19.

An electromagnet 20 is provided of arcuate form in the present instance to conform to the casing 11, 12 and to the frame rings 17 and be received between said rings. The terminals 21 of magnet 20 connect with the conductor wires leading through the block 18 and base 10 as hereinafter explained. Between the frame rings also is provided a stop signal lamp 22 in front of which is the word "Stop" produced in one of the casing sections as 11. Transverse side bars 24 are provided on the block 18 from which rise standards 25 on the upper end of which is pivotally mounted a pointer designated generally by the numeral 26. Said pointer turns on pivot pins 27 disposed laterally inward toward each other at the upper ends of the standards 25. The pointer 26 is equipped with an electromagnet 28 and with an electric lamp 29 to illuminate the pointer. The front and back 30 of the pointer 26 are transparent, the transparent portion being given the form of an arrow or other suitable shape for indicating a turning to the right or left according to the direction in which the pointer 26 is swung under the influence of the coils 20, 28 as further referred to.

Electrical connection between the pins 27 and the magnet 28 is established by resilient contacts 31 extending from brackets 32 as best seen in Figures 3 and 4, said brackets being in electrical connection with the terminals 33 of magnet 28. Said magnet 28 is supported at its lower end on a cross bar 34 of pointer 26 and at the upper end of the magnet the core is secured by screw 35, which screw also serves to secure to the end of the pointer a rubber cushioning washer 37 adapted to contact with stops 36 at the extreme right and left positions of said pointer.

A switch 38 and the battery 39 are in circuit with the signal, one side of the battery connecting by wire 39$^b$ with a terminal 40, the other side of battery connecting by the ground and a wire 39$^a$ with switch lever 41 as at 42. On each side of switch lever 41 are resilient contacts 43, 44 extending from posts 45, 46. A U-shaped flaring contact element 47 has its flaring ends 48 terminating close to but normally out of engagement with the contacts 43, 44. The insulated end 50 of the switch lever 41 is disposed between the legs of U-shaped contact 47 for moving either terminal 48, 49 into engagement with the respective contacts 43, 44, said contacts 43, 44 being in constant contact with the lever 41. A second switch lever 51 is optionally operable to cut in or out the lamp 29 as hereinafter referred to.

Switch 38 is provided also with posts 52, 53. U-shaped contact 47 at the bend thereof in the illustrated example is rigid with a head 54 on a post 55 secured by nuts 56 to the insulating body 38$^a$ of switch 38.

One terminal 21 of the magnet 20 connects with a conductor 57 which leads to the posts 52, 53. The other terminal 21 connects with a conductor 58 running to the battery wire 39$^b$, the wire 39$^b$ leading from the battery, 39, to the terminal 40.

One terminal 33 of magnet 28 connects by a conductor 59 with a post 45 of the contact 43 at one side of the switch lever 41 while the other terminal 33 of magnet 28 connects by conductor 60 with the post 46 of the contact 44 at the opposite side of switch lever 41.

Figure 2:
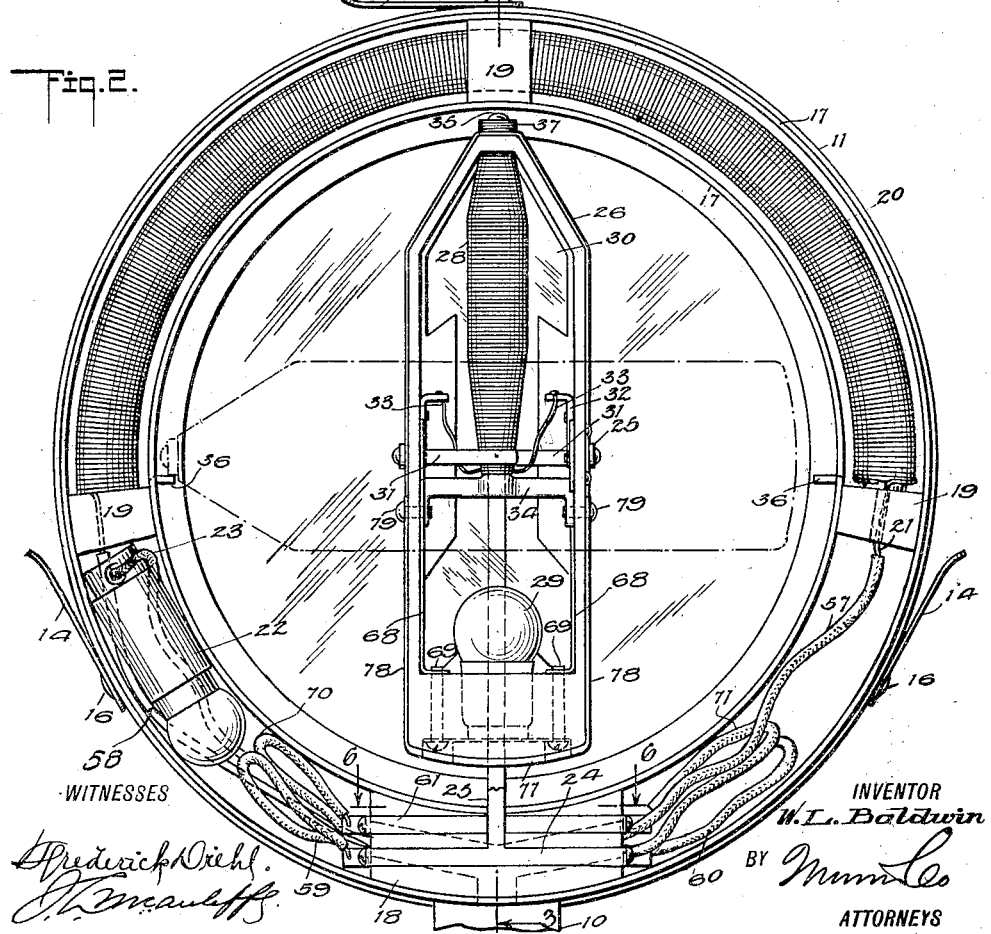
Figure 2 is an enlarged view of the signal with casing parts removed to show the interior construction and arrangement.

The circuit to the pointer lamp 29 is made as follows in the illustrated example: In addition to the cross bars 24 on the block 18 cross bars 61 are provided on said block at opposite sides. Rising from the cross bars 61 are standards 62 disposed at the inner side of the standards 25 and terminating in eyes 63 concentric with the pins 27 and insulated therefrom by a bushing 64. The eyes 63 extend into eyes 65 on cross bars 66, see Figure 7, on the opposite sides of pointer 26. Screws 67 pass through the laterally bent ends of the cross bars 66 to the interior of the pointer, 26, and engage in conductor strips 68 disposed on the pointer in the interior at opposite sides of the lamp 29 in planes at right angles to the standards 62. Said conductor strips 68 are connected with the lamp terminals 69, see Figure 2.

A conductor wire 70 grounds one strip 61 while the other strip 61 connects by conductor 71 with the terminal 72 on switch 38 and adapted to be engaged by the switch lever 51 for establishing connection through the said lever 51 between the terminal 72 and the post 40, said post 40 being connected by a conductor strip 73 with the contact 47. Thus, the throwing of the lever 51 in or out will cut the pointer lamp 29 in the battery circuit or cut out said lamp.

Figure 8:
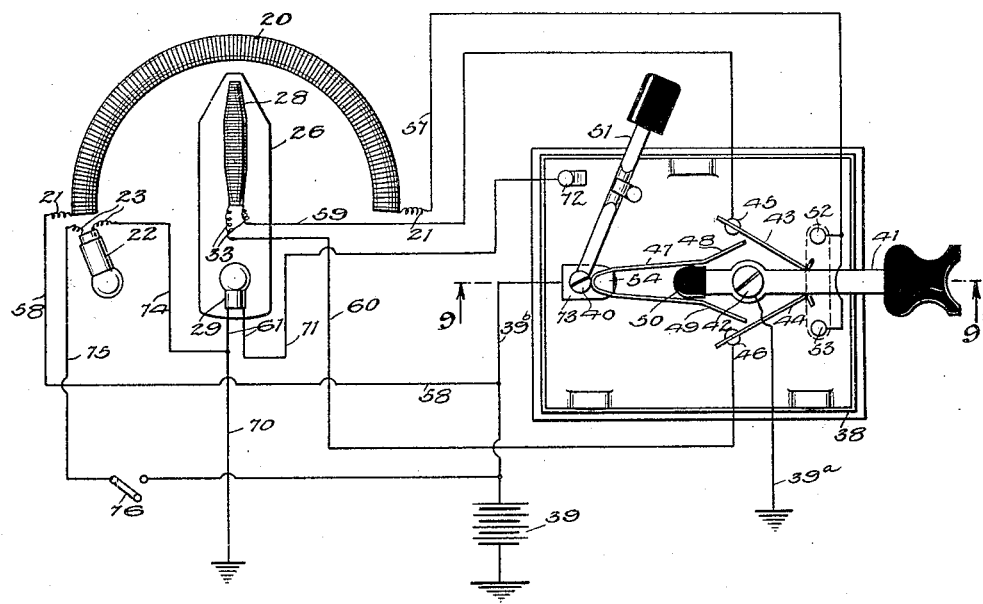
Figure 8 is a diagrammatic view of a circuit which may be employed.
Figure 9:
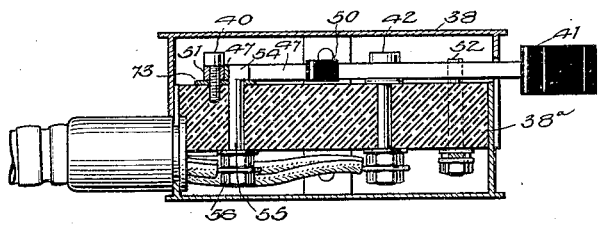
Figure 9 is a section through the switch as indicated by the line 9—9, Figure 8.

With the described circuit the flow of current in magnet 20 is unidirectional while the polarity of pointer magnet 28 is reversed for the movement of the pointer to the right or to the left. Thus, referring to Figure 8, if the switch lever 41 be thrown to move the contact 43 in engagement with the post 52 the current will flow from the battery 39 through conductor 39$^b$ and wire 58 to one terminal 21 of magnet 20; and from the opposite terminal 21 of said magnet through conductor 57 to post 52 through switch lever 41 and conductor 39$^a$ to ground. At the same time the current will flow from battery 39 to conductor 39$^b$ to elements 73 and 40, contact 49, post 46 and through conductor 60 to one terminal 33 of magnet 28 and from the opposite terminal 33 of magnet 28 through wire 59 to post 45, contact 43, switch lever 41 and to ground wire 39$^a$. On the other hand if the switch lever 41 be thrown in the opposite direction to engage contact 44 with post 53, the current from battery 39 to magnet 20 will still flow through conductor 39$^b$ and wire 58 to a terminal 21 of said magnet 20 and from the opposite terminal 21 of magnet 20 through conductor 57 to post 53 and through switch lever 41 and conductor 39$^a$ to the ground; but the current to magnet 28 will now be from battery 39 to 39$^b$, 73, 40, 47, 48, post 45, through conductor 59 to the opposite terminal 33 of magnet 28, the current returning through the wire 60 and post 46 and through contact 44, switch lever 41 and conductor 39$^a$ to the ground.

The stop lamp 22 has one terminal 23 thereof connected by conductor 74 with ground wire 70 and the opposite terminal 23 connected by conductor 75 with the battery, said conductor 75 having a manually operable switch or circuit breaker 76 so that the stop lamp can be cut in or cut out as desired.

A counter-balance weight 77 is provided on the pointer 26 tending normally to maintain the same in a neutral upright position. Said weight may have arms 78 extending along the sides of the pointer secured by screws 79.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A signal of the class described including a fixed electromagnet, a pivoted hollow pointer located adjacent to said fixed electromagnet, an electromagnet secured within said pointer and connected electrically in parallel with the first magnet, and means to optionally reverse the direction of the current flow in one of said magnets.

2. A signal of the class described including a fixed magnet of arcuate shape, a pointer, an electromagnet in said pointer, conductor elements having pivots mounting said pointer at opposite sides, said pivots being concentric with the arcuate fixed magnet, and electrical connections between the pivots and the terminals of the pointer magnet.

3. A signal of the class described including a fixed magnet of arcuate shape, a pointer, an electromagnet in said pointer, conductor elements having pivots mounting said pointer at opposite sides, said pivots being concentric with the arcuate fixed magnet, electrical connections between the pivots and the terminals of the pointer magnet; an electric circuit, said pointer including said pivots, said electrical connections and magnet, and means in said circuit optionally operable to reverse the direction of current flow through the pointer magnet.

4. In a signal of the class described, a pivotally mounted hollow pointer, an electromagnet therein, conductor standards having pivots about the axis of which said pointer may turn, and contact elements in the pointer engaging said pivots and in electrical connection with the terminals of said magnets.

5. In a signal of the class described, a casing, an electromagnet in said casing of fixed polarity, a pivotally mounted hollow pointer in said casing, an electromagnet in said pointer, and means for reversing the polarity in one of said electromagnets.

6. In an indicator of the class described, a casing, a hollow pointer pivoted within said casing, a magnetic coil arranged in said pointer, an electrical circuit for said coil, a reversible switch in series with said circuit, said switch being adapted to simultaneously connect the two coils in the circuit, but reversing the current to the coil within the pointer whenever desired.

WALTER LEO BALDWIN.